Sept. 14, 1937.  J. A. TENNANT  2,092,818
RELIEF VALVE
Filed July 8, 1933
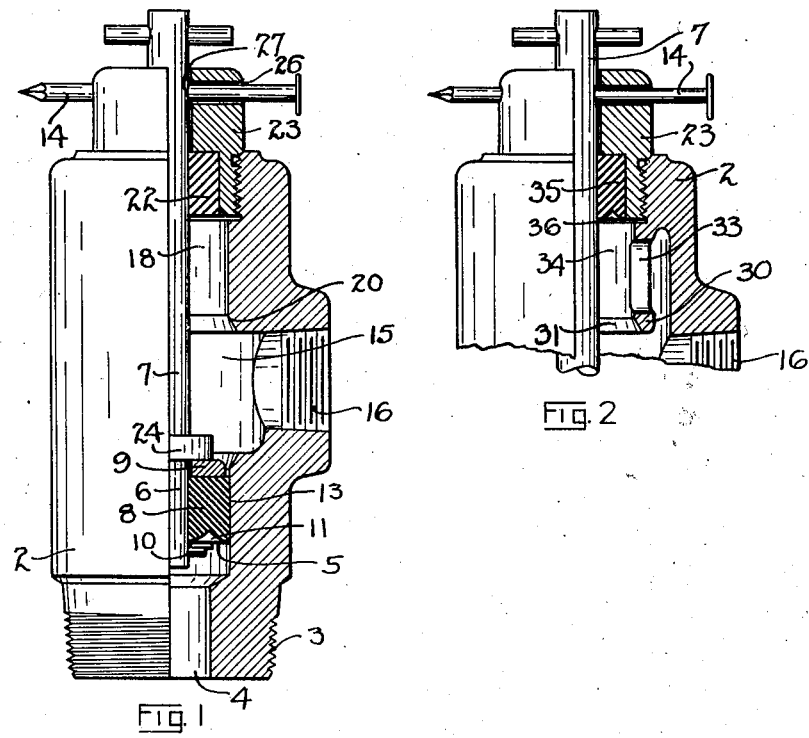
JOSEPH A. TENNANT
INVENTOR.
BY Jesse R. Stone
Lester B. Clark
ATTORNEYS.

Patented Sept. 14, 1937

2,092,818

UNITED STATES PATENT OFFICE 2,092,818

RELIEF VALVE

Joseph A. Tennant, Houston, Tex., assignor to Abercrombie Pump Co., Houston, Tex., a corporation of Texas Application July 8, 1933, Serial No. 679,468

5 Claims. (Cl. 137—53)

The invention relates to an improvement in shear relief valves which are adapted for connection to fluid pressure lines or pumps wherein it is desired that the pressure will be released when the pressure exceeds a predetermined amount.

It is one of the objects of the invention to provide a relief valve wherein the shock of opening of the valve will be cushioned by the valve member as it moves to a fully open position.

Another object of the invention is to provide a cushion for relief valves wherein the sealing member of the valve moves into a cushioning chamber.

Another object of the invention is to provide a dash pot arrangement for shear relief valves so that the shock of opening of the valve member will be gradually absorbed.

A still further object of the invention is to provide a cushioning arrangement for shear relief valves which are to be inserted in liquid pressure lines.

Other and further objects of the invention will be readily apparent when the following description is considered in connection with the accompanying drawing wherein:

Fig. 1 is an elevation partly in section, showing the general arrangement of the invention and particularly the cushioning chamber for the valve member.

Fig. 2 is a broken view showing the cushioning end of the valve member with the dash pot arrangement for stopping the valve member.

The general arrangement and assembly of the valve herein is disclosed in the copending application for a Relief valve, Serial No. 588,280, filed January 23, 1932 by Herbert Allen, which has matured into Patent No. 2,071,375.

The valve housing is indicated generally at 2 and is provided with a shank or flange 3 which is to be inserted in the fluid pressure line or connection. It is to be understood that the valve may be positioned in any suitable location where it is contemplated that pressure exceeding a predetermined value will be encountered and wherein it is desired to release the pressure when it exceeds this predetermined amount. With this in mind the valve will be attached so that the pressure in the line will be available in the entrance passage 4 and will be exerted against the exposed face 5 of the valve member 6. The valve member is made up of the stem 7 and the packing or sealing element 8. The element 8 is held in position on the stem 7 by means of the washer 9 and the retaining pin 10. It will be observed that the packing 8 is of the lip type, having the groove 11 therein so that the pressure applied to the face will tend to expand the packing and form a seal with the sealing face 13. The packing 8 is of the type described in the prior application of Herbert Allen, and permits limited movement of the stem 7 to cause shearing of the pin 14 before the seal is broken with the sealing face 13. This is of advantage because if the packing adheres to the housing or is corroded in position, the valve will open at the proper pressure, because the stem 7 can move relative to the housing because of the resilience of the packing.

The entrance passage 4 leads to the relief chamber 15 and the discharge passage 16. The passage 16 may lead to the atmosphere or it may be a continuation of the connection in which the valve has been inserted.

The present type of valve is particularly adapted for high pressure lines, and with this in mind it is intended that a cushion will be provided for the valve member to bring it to a stop as it moves to open position. To this end, the housing 2 has been provided with a cushion chamber 18, which is formed in the housing and is of the same diameter as that portion of the entrace passage 4 in which the valve is seated. The form of the invention shown in Fig. 1 is particularly arranged for use where the excessive pressure will be discharged into the atmosphere. This form can also be used in fluid pressure lines as distinguished from liquid pressure lines. Where the chambers 15 and 18 are filled with air, vapor or gas, it is desirable to cushion the opening movement of the valve member and to bring it to a stop with as little shock as possible. Because of the fact that the cushion chamber 18 is of the same diameter as the valve receiving portion of the entrance passage 4, the packing 8 will fit as tightly in this cushion chamber as it does in the valve chamber. The cushion chamber is tapered at 20 in order to guide the packing member 8 into the cushion chamber. When excessive pressure occurs and the pin 14 shears, then of course the valve member will move upwardly, as viewed in Fig. 1, across the relief chamber 15, and as the packing 8 moves into the cushion chamber 18 it tends to trap a quantity of air or vapor in this cushion chamber. This will serve to slow down the movement of the valve member, and in all probability the valve member will have some hunting action back and forth as it comes to a position of rest because of the compression and expansion of the fluid trapped in the cushion chamber 18.

In addition to the cushion chamber 18, the resilient cushion member 22 has been provided in the cap 23 so that the flange 24 on the stem 7 will strike this cushion if the force of the opening is sufficient to compress the fluid in the chamber 18. The cap 23 is provided with an opening 26 which receives the shear pin 14. This pin passes through the opening 27 in the stem to normally retain the valve in closed position. It is intended that any size shear pin may be used in order to obtain the desired resistance to opening of the valve.

Fig. 2 shows a form of the invention which is particularly adapted for use in liquid pressure lines where liquid will be present on both sides of the valve member 8. Because of the presence of liquid in back of the valve in the relief chamber 15, it is desirable to provide a dash pot arrangement for bringing the valve to a position of rest. With this in mind, the sleeve 30 has been provided within the housing 2 and has an internal diameter equal to the diameter of the packing 8 or the same as the valve chamber in the entrance passage 4 as seen in Fig. 1. This sleeve 30 is tapered at 31 to guide the packing member into its cushioning position. A slot 33 is shown in Fig. 2 in the sleeve 30 in order to permit the gradual escape of the liquid which is trapped in the cushion chamber 34 as the valve moves to open position. The slot is desirable because the pressure exerted on the valve member tending to trap a body of liquid in the chamber 34 would be enormous. If, however, this liquid is allowed to gradually escape from behind the valve member, it will bring it to a position of rest and the shock of opening will be absorbed. It seems obvious that in view of the fact that pressure will be exerted over the entire exposed face of the valve member, that this pressure will gradually cause the liquid trapped in the chamber 34 to escape from the slot 33.

As the packing 8 moves into this sleeve 30, the full area of the slot 33 will be available to permit the escape of liquid from behind the valve. As the valve moves farther into the chamber, however, the area of the slot 33 which is available for the escape of liquid will be gradually reduced so that the movement of the valve will be slowed down in accordance with the exposed area of the slot 33. A cushion 35 is provided in the cap 23 in this form of the invention, the same as shown in Fig. 1. This cushion has a lip 36, however, similar to the lip on the valve packing 8. Any desired type of shearing device may be provided in connection with the dash pot arrangement of Fig. 2.

What is claimed is:

1. In a relief valve, a housing, a valve member therein, shear means to hold said member closed, a chamber to receive said valve member upon opening and to have said valve member trap a body of fluid therein to cushion the movement of said valve member, and a discharge slot from said chamber to be gradually covered by said valve member to control the cushioning of said valve member.

2. In a shear relief valve including a housing, a valve seat therein, a sleeve also in said housing, a valve member adapted for movement from said seat into said sleeve, means on said valve member to fit said sleeve and trap a body of fluid therein to resist the movement of said valve member, a leak passage from said sleeve whereby the resistance to movement of said member in said sleeve is reduced, and a resilient cushion also in said housing and adapted to receive said valve member when it moves to full open position.

3. A shear relief valve including a body, a valve member therein, a sealing piece on said member, a cylinder in said housing with which said piece forms a seal, a stem on said valve member, shear means passing through the housing and stem to be sheared and release said member, and a cushion chamber of a size to receive said valve member and piece as they move to open position upon shearing of said means whereby the movement of the valve member is cushioned by said piece trapping fluid in said chamber.

4. A shear relief valve including a body, a valve member therein, a sealing piece on said member, a cylinder in said housing with which said piece forms a seal, a stem on said valve member, shear means passing through the housing and stem to be sheared and release said member, and a cushion chamber of a size to receive said valve member and piece as they move to open position upon shearing of said means whereby the movement of the valve member is cusioned by said piece trapping fluid in said chamber, and an additional resilient cushion carried by said housing to receive said valve member.

5. A shear relief valve including a body, a valve member therein, a sealing piece on said member, a cylinder in said housing with which said piece forms a seal, a stem on said valve member, shear means passing through the housing and stem to be sheared and release said member, and a cushion chamber of a size to receive said valve member and piece as they move to open position upon shearing of said means whereby the movement of the valve member is cushioned by said piece trapping fluid in said chamber, and an opening from said chamber to allow a gradual escape of the trapped fluid.

JOSEPH A. TENNANT.